Feb. 21, 1961 V. G. SOROKIN ET AL 2,972,711
ROTATING RECTIFIER
Filed Dec. 11, 1957 2 Sheets-Sheet 1

WITNESSES
Edwin E. Bassler
Ernest P. Klipfel

INVENTORS
Victor G. Sorokin &
Alexander S. Wolanin
BY
ATTORNEY

Feb. 21, 1961        V. G. SOROKIN ET AL        2,972,711
ROTATING RECTIFIER
Filed Dec. 11, 1957                       2 Sheets-Sheet 2

United States Patent Office 2,972,711
Patented Feb. 21, 1961

2,972,711
ROTATING RECTIFIER

Victor G. Sorokin, Murrysville, and Alexander S. Wolanin, Oakland, Pa., assignors to Westinghouse Electric Corporation, East Pittsburgh, Pa., a corporation of Pennsylvania Filed Dec. 11, 1957, Ser. No. 702,166

4 Claims. (Cl. 317—234)

Our invention relates to rotating rectifiers and in particular to a rotating rectifier construction for use in excitation systems of synchronous alternating current machines of the brushless type.

Synchronous alternating current machines of the brushless type have an alternating current exciter with means for rectifying the alternating current output for supplying direct current excitation to the field winding of the main machine. For this purpose, a rotating rectifier assembly is mounted on the same rotating member as the field of the main machine and the armature winding of the exciter. Such a rectifier assembly preferably consists of a suitable number of semiconductor rectifying devices connected in any suitable rectifier circuit. In this way, an alternating current machine is provided which requires no commutator, slip rings or brushes such as are necessary in the conventional type of machine using a direct current exciter.

Some types of brushless synchronous alternating current machines, such as turbogenerators, require operation at high speeds for extended periods of time. In such machines, it is most desirable that such operating periods be free from interruption of service. A rotating rectifier construction for brushless turbogenerators must be capable of withstanding the high centrifugal forces due to the high speed of rotation, which is usually 3600 r.p.m. Further, semiconductor rectifying devices have limited safe operating temperature ranges, thereby requiring a rectifier assembly construction capable of adequately cooling the rectifiers. The semiconductor rectifying devices themselves are very difficult to cool adequately within their safe operating temperature range. They also must be made readily accessible for replacement or repair. Thus, a rotating rectifier assembly construction for use in turbogenerators of the brushless type has numerous difficult problems.

The principal object of the present invention is to provide a rotating rectifier assembly capable of operating at high speeds and withstanding the centrifugal forces accompanying such speeds.

Another object of the present invention is to provide a rotating rectifier assembly allowing easy maintenance of the assembly and easy replacement or repair of defective rectifier devices.

Another object of the present invention is to provide a rotating rectifier assembly with means for keeping the temperature of the rectifying devices within safe limits.

Other objects and advantages of the invention will be apparent from the following detailed description, taken in connection with the accompanying drawing, in which.

Figure 1:
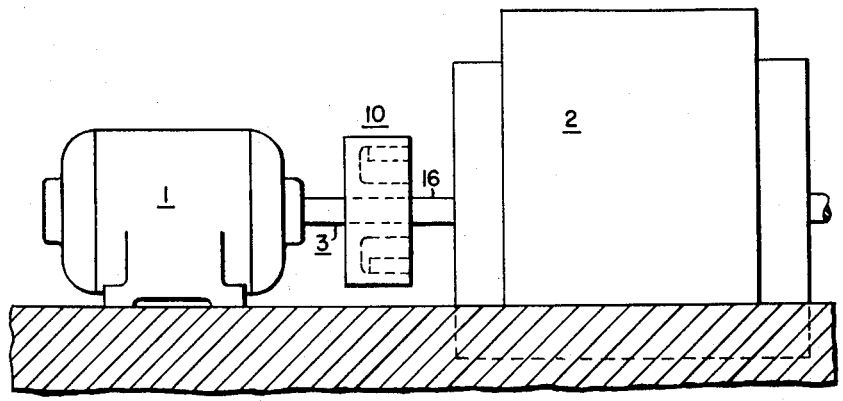
Figure 1 is an elevational view of an illustrative embodiment of our invention in the excitation system of a turbogenerator.
Figure 2:
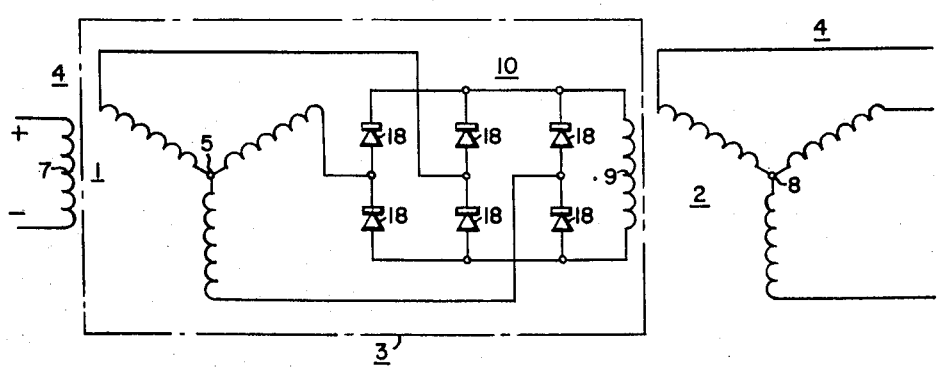
Fig. 2 is a schematic diagram of the electrical connections of a brushless type alternator.

The invention is shown in the drawing, for the purpose of illustration, in a typical embodiment with an alternating current exciter 1 for an alternating current turbogenerator 2. It will be understood, however, that the present invention is not restricted in its application to turbogenerators, but is generally applicable to any synchronous machine of the brushless type.

The exciter 1 and generator 2 may be of any suitable construction and are shown in the drawing as having a common rotating member 3 and stationary members 4. The alternating current exciter 1 has a three-phase armature winding 5, which is carried on the rotating member 3 and has a field winding 7 on the stationary member 4 excited by any suitable external direct current source. The generator 2 has a three-phase armature winding 8 disposed on the stationary member 4 and a field winding 9 which is carried on the rotating member 3 of the machine and which is adapted to be supplied with direct current excitation. The alternating current output of the alternating current exciter 1 is rectified by the rectifier assembly 10. The rectifier assembly 10 shown mounted integral with the rotating member 3 connects the three-phase exciter armature winding 5 to the field winding 9. In this manner, direct current excitation is supplied to the field winding 9 of the generator 2 without requiring a commutator or slip rings and without brushes.

Figure 4:
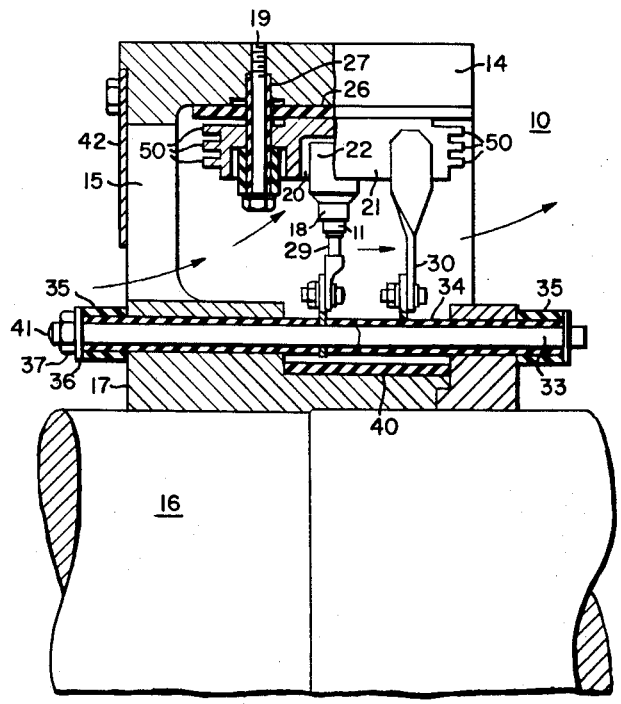
Fig. 4 is a fragmentary longitudinal view partly in section on the line IV—IV of Fig. 3.
Figure 3:
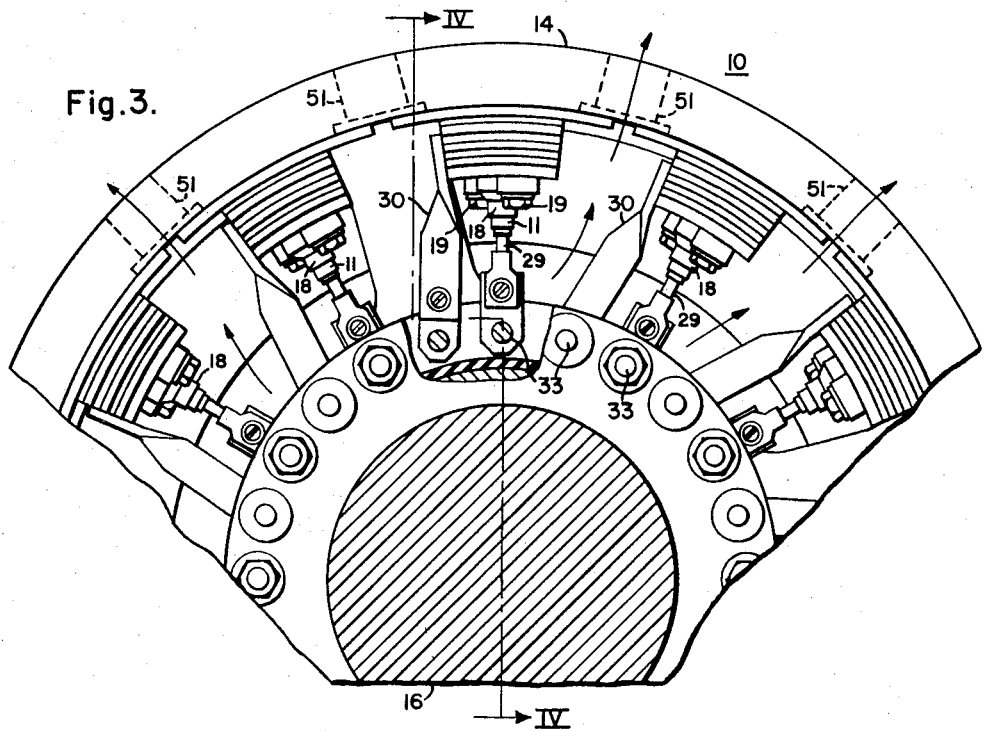
Fig. 3 is a fragmentary transverse view of the construction of our invention.

As mentioned previously, the high speeds and the high centrifugal forces developed in turbogenerator applications require a rectifier assembly capable of withstanding such high speeds and having provisions for adequate cooling of the rectifier devices. Figs. 3 and 4 show the preferred construction of the rectifier assembly 10 in which a retaining member, shown as an annular flange 14, is utilized to mount the semiconductor rectifying devices 18 which are preferably of the silicon type because of their high current carrying capacity. The annular flange 14 provides a structural member capable of supporting the semiconductor rectifying devices and protecting them against the centrifugal forces. A spider frame 15, attached to the rotating shaft 16 by means of the shaft mounting or hub portion 17, supports the annular flange 14 on the rotating member 3. The flange 14 may be integral with the rotating member 3 but can be mounted between the exciter and generator or on one end thereof by means of a collar-like fit on the shaft 16.

The retaining member or annular flange 14 serves as a base for the mounting of the semiconductor rectifying devices 18. The rectifying devices 18 are radially mounted on the annular flange 14 by means of heat conductive blocks 21 which have threaded receptacles 20 for receipt of the base 22 of the semiconductor rectifying devices 18. The rectifying device could also be soldered to the conductive block 21 or fastened thereto in any suitable manner. Of course, more than one rectifying device 18 can be mounted on a given heat conductive block 21 when their electrical potentials are the same. The heat conductive blocks 21 are, in turn, bolted to the annular flange 14 by means of bolts 19 which clamp the blocks 21 to the flange 14 in an axial direction. In this manner, the centrifugal forces are utilized to properly seat the rectifying devices 18 and keep the assembly in position within the annular flange 14. An insulating plate 26 serves as a pad and insulating medium between the annular flange 14 and the heat conductive block 21. It is necessary to insulate the block 21 from the annular flange 14 since the base end 22 of the semiconductor rectifying device 18 is usually at a potential other than the flange 14. A plurality of bolts 19, two being illustrated, hold the block 21 to the annular flange 14 within the annular flange's confinement. An insulating tube 27 and insulating collar 28 provide electrical insulation between the bolt 19 and the annular flange 14 so that the semiconductor rectifying devices 18 are not grounded through the rotating rectifier assembly.

Each semiconductor rectifying device 18 has a first lead connector 29 brought out of the rectifying device 18 through a glass bushing 11 and a second lead connector 30 attached to the mounting block 21 receiving the base 22 of the particular rectifying device 18. Each connector can be flexible or rigid and is brought out to an associated separate individual conductive rod 33. The conductive rods 33 are equally distributed circumferentially and supported in the hub portion 17 of the retaining member 14 around the shaft 16 of the rotating member 3. The conductive rods 33 serve as terminal means for the positive and the negative leads of the semiconductor rectifying devices 18. Each conductive rod 33 is inserted in an insulating tube 34 electrically insulating the conductive rod 33 from the hub portion 17 of the rotating member 3. A second insulating collar 35 is coaxially placed about the conductive rod 33 and the insulating tube 34 to provide supporting means for each conductive rod 33 for positioning each rod axially in the hub portion 17 of the rotating rectifier assembly 10. A washer 36 and lock nut 37 is provided at at least one end of the conductive rod 33 thereby insuring proper positioning of each rod. To further insure the proper electrical clearances between the connectors 29 and 30 and the hub portion 17 of the rotating rectifier assembly 10, an insulating ring 40 is slipped over the hub portion 17 immediately below the first lead connector 29 and the second lead connector 30 so that the connectors will be adequately protected from ground.

Each conductive rod 33 is supplied with an electrical terminal 41 at a selected end. By positioning the electrical terminals 41 at the proper end of each conductive rod 33, the direct current connections can be made to the terminals of the field 9 of the generator 2 on one end of the rotating rectifier assembly 10, while the alternating current terminals can all be located on the other end so as to furnish an orderly and easy means for connecting the rectifier assembly between the armature winding 5 of the exciter 1 and the field winding 9 of the generator 2. Thus, the semiconductor rectifying devices 18 are mounted to withstand the centrifugal forces present as well as furnishing an orderly wiring layout and adequate clearances between the electrical conductors and the mounting assembly.

To maintain the proper operating temperatures for the semiconductor rectifying devices 18, fins 50 are formed on the heat conductive blocks 21 thereby furnishing a greater heat radiation surface for the coolant air to pass over in heat transfer relation therewith. Even silicon has a definite maximum operating temperature limit so the blocks 21 provide very efficient heat sinks for dissipating heat. It should be noted that the bolts 19 used to mount the heat conductive blocks 21 are slightly offset from the center line of the block 21. Such a mounting gives the block 21 stability inside the annular flange 14 particularly at high speeds. At the same time, the bolts 19 as well as the other parts having radial surfaces serve as blade-like members to effect a centrifugal fan action. A circular baffle 42 is mounted on the annular flange 14 at the end where the spider frame 15 is attached to direct the air flow. Openings 51 are drilled radially through the annular flange 14 for the discharge of coolant air and to increase the fan action, which draws air past the circular baffle 42, across the rectifying devices 18, and over the heat conductive blocks 21 in heat transfer relation therewith. The coolant air is then discharged through the openings 51 as well as out the opposite end with an air flow pattern as indicated by the arrows shown in Fig. 3 and Fig. 4.

It should now be apparent that our invention has provided a rotating rectifier assembly with surety of operation and ease of maintenance heretofore unavailable.

Our invention has provided a means for making use of the generated centrifugal forces by mounting the rectifying devices 18 radially to the shaft 15 of the rotating member 3 with the heavier portion of the device 18 at the inside of the annular flange 14. Cooling at these high speeds has been accomplished by means of forming the devices 18 and their mounting in such a manner as to simulate a centrifugal fan, thereby forcing coolant air over the rectifying devices 18 and their heat conductive blocks 21 as well as through the annular flange 14 by means of the openings 51 therein. Each rectifying device 18 has its positive and negative terminals brought out by lead connectors 29 and 30 to individual conductive rods 33 thereby allowing the connection of the devices 18 in any desired electrical circuit. By so doing, each rectifying device 18 can be individually tested and replaced if necessary with maximum ease.

It should now be apparent that our invention has provided a rotating rectifier assembly with surety of operation and ease of maintenance heretofore unavailable. Although this invention has been described with a certain degree of particularity, it is to be understood that this present disclosure has been made only by way of example and that numerous changes in the details, combination and arrangement of parts may be accomplished without departing from the spirit and scope of the invention.

We claim as our invention:

1. In combination, an annular flange having a spider frame and hub portion adapted to be mounted on a rotating shaft, a plurality of spaced heat conductive blocks fastened to but electrically insulated from the interior surface of said flange extending radially between said annular flange and said hub portion, a semiconductor rectifying device radially mounted on each said block intermediate said flange and said hub portion and having one end in electrical and heat transfer relation therewith, said devices and said blocks being disposed to effect a fan action drawing the ventilating air across the devices and blocks in heat transfer relation therewith.

2. In combination, an annular flange having a spider frame and hub portion adapted to be mounted on a rotating shaft, a plurality of spaced heat conductive blocks fastened to but electrically insulated from the interior surface of said flange, a semiconductor rectifying device radially mounted on each said block and having one end in electrical and heat transfer relation therewith, said devices and said blocks being disposed to effect a fan action drawing the ventilating air across the devices and blocks in heat transfer relation therewith, a baffle axially mounted on the inlet air side of said flange directing ventilating air towards said devices, said flange having spaced radial openings for the discharge of ventilating air from the devices and blocks, a pair of conductive rods for each rectifying device circumferentially distributed within said hub portion but electrically insulated therefrom, one of said rods electrically connected intermediate its ends to the other end of said rectifying device, the other of said rods electrically connected intermediate its ends to the block, each of said rods having means for electrical terminal connections to either end of each said rod.

3. In combination, an annular flange having a spider frame and hub portion adapted to be mounted on a rotating shaft, a plurality of spaced, heat conductive blocks fastened to but electrically insulated from the interior surface of said flange, extending radially between said annular flange and said hub portion a semiconductor rectifying device radially mounted on each said block intermediate said flange and said hub portion and having one end in electrical and heat transfer relation therewith, said devices and said blocks being disposed to effect fan action drawing the ventilating air across the devices and blocks in heat transfer relation therewith, a pair of conductive rods for each rectifying device circumferentially distributed within said hub portion but electrically insulated therefrom, one of said rods electrically connected intermediate its ends to the other end of said rectifying device, the other of said rods electrically connected intermediate its ends to the block, each of said rods having means for electrical terminal connections to either end of each said rod.

4. In combination, an annular flange having a spider frame and hub portion adapted to be mounted on a rotating shaft, a plurality of heat conductive blocks secured to but insulated from the interior surface of said flange, semiconductor rectifying device embedded in each said block and having one end in electrical and heat transfer relation therewith, a pair of conductive rods for each rectifying device circumferentially distributed with said hub portion but electrically insulated therefrom, one of said rods electrically connected intermediate its ends to the other end of said rectifying device, the other of said rods electrically connected intermediate its ends to the block, each of said rods having means for electrical terminal connections to either end of each said rod.

References Cited in the file of this patent

UNITED STATES PATENTS

| 2,414,287 | Crever | Jan. 14, 1947 |
| 2,665,334 | Brainard | Jan. 5, 1954 |
| 2,861,227 | Scherbaum | Nov. 18, 1958 |

FOREIGN PATENTS

| 911,198 | France | Mar. 4, 1946 |